United States Patent
Oshima et al.

(10) Patent No.: US 6,979,280 B2
(45) Date of Patent: Dec. 27, 2005

(54) CONTROL APPARATUS AND CONTROL METHOD FOR VEHICLE

(75) Inventors: Koji Oshima, Nagoya (JP); Hiromichi Kimura, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/618,052

(22) Filed: Jul. 14, 2003

(65) Prior Publication Data

US 2004/0014565 A1    Jan. 22, 2004

(30) Foreign Application Priority Data

Jul. 22, 2002    (JP)    .............................. 2002-213026

(51) Int. Cl.⁷ ............................................. B60K 41/20
(52) U.S. Cl. .................. 477/186; 477/73; 477/74; 477/94; 477/110; 477/187
(58) Field of Search ............................. 477/71, 73, 74, 477/92, 94, 110, 183, 184, 185, 186, 187

(56) References Cited

U.S. PATENT DOCUMENTS

| | | | | |
|---|---|---|---|---|
| 5,830,105 A | * | 11/1998 | Iizuka | 477/92 |
| 5,842,951 A | * | 12/1998 | Yasue et al. | 477/149 |
| 6,044,924 A | * | 4/2000 | Adli | 180/302 |
| 6,353,787 B2 | * | 3/2002 | Nishiyama | 701/93 |

FOREIGN PATENT DOCUMENTS

| | | | |
|---|---|---|---|
| EP | 530842 | * | 3/1993 |
| JP | 5-77662 | | 3/1993 |
| JP | 10-47100 | | 2/1998 |
| JP | 11-5461 | | 1/1999 |
| JP | 11-278103 | | 10/1999 |
| JP | 2000-142167 | | 5/2000 |
| JP | 2000-233730 | | 8/2000 |

* cited by examiner

Primary Examiner—Ha Ho
(74) Attorney, Agent, or Firm—Oblon, Spivak, McClelland, Maier & Neustadt, P.C.

(57) ABSTRACT

In a control apparatus for a vehicle, when a coast downshifting is performed in response to a downshifting command from a vehicle operator during braking operation under the fuel cut control, the braking force of the wheel brake is increased so as to increase the deceleration. This makes it possible to achieve a predetermined deceleration with a good response to the deceleration request of the vehicle operator represented by the downshifting command. The control apparatus is structured to decrease the braking force of the wheel brake such that the increase in the engine braking force is offset by the inertia caused by the rise in the engine speed resulting from downshifting upon the coast downshifting due to the vehicle speed increase. The control apparatus for the vehicle, thus, reduces the shock caused by the sharp increase in the engine braking force.

11 Claims, 8 Drawing Sheets

FIG.2

| POSITION | | CLUTCH&BRAKE | | | | | | | O.W.C. | |
|---|---|---|---|---|---|---|---|---|---|---|
| | | C1 | C0 | C2 | B1 | B2 | C3 | B3 | F1 | F2 |
| N, P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| | 1st ENGINE BRAKING | ○ | × | × | × | ○ | × | ○ | △ | △ |

CONTROL APPARATUS AND CONTROL METHOD FOR VEHICLE

INCORPORATION BY REFERENCE

The disclosure of Japanese Patent Application No. 2002-213026 filed on Jul. 22, 2002, including the specification, drawings and abstract are incorporated herein by reference in its entirety.

BACKGROUND OF THE INVENTION

1. Field of Invention

The invention relates to a control for a vehicle and, more particularly, to a deceleration control for the vehicle executed upon a coast downshifting operation, that is, downshifting operation of an automatic transmission performed in a coast state of the vehicle where the throttle valve is substantially fully closed.

2. Description of Related Art

There is known a vehicle that includes (a) an engine that generates power through combustion of fuel, and (b) an automatic transmission that transmits a reverse input from the driving wheel to the engine, and establishes a speed selected among a plurality of forward speeds each having a different speed ratio. A control apparatus disclosed in JP-A-11-278103, for example, executes a fuel cut control (F/C control) that interrupts supply of the fuel to the engine when a predetermined fuel cut (F/C) condition is satisfied, for example, when an engine speed becomes equal to or higher than a predetermined engine speed at release of the F/C control (hereinafter referred to as the F/C release engine speed). The aforementioned control apparatus increases the engine speed to expand a fuel cut range (vehicle speed range) by bringing a lock-up clutch of a torque converter into a slip engagement under the F/C control. When the lock-up clutch is engaged, the throttle valve is opened so as to prevent temporary increase in the engine braking force.

Even if the above-described control apparatus is employed in the vehicle, an inertia caused by the change in the engine speed may vary the engine braking force upon downshifting of the automatic transmission resulting from the decrease in the vehicle speed. This may cause a shock felt by the vehicle operator. In the case where the vehicle speed upon downshifting in the coast state (coast downshifting operation) is set to be a relatively higher value for continuing the F/C control, a range of the change in the engine speed resulting from the downshifting becomes wider, thus causing the vehicle operator to feel further shock.

In the case where the vehicle is running downhill, the engine braking force is increased to decelerate by performing the downshifting operation of the automatic transmission. This operation, however, may cause the engine braking force to temporarily become excessively large or fail to generate sufficient engine braking force, resulting in inappropriate deceleration control performance.

SUMMARY OF THE INVENTION

It is an object of the invention to provide a vehicle control apparatus capable of providing appropriate deceleration performance upon the coast downshifting operation under the fuel cut control.

A control apparatus for a vehicle includes an engine that generates power through combustion of fuel, an automatic transmission that transmits a reverse input from a driving wheel to the engine and automatically performs a shifting to a speed selected among a plurality of forward speeds each having a different speed ratio, and a brake control system that electrically controls a braking force of a wheel brake. In the control apparatus, the brake control system serves to control the braking force of the wheel brake such that a predetermined deceleration is established upon a coast downshifting of the automatic transmission during running of the vehicle in a coast state where a throttle valve of the engine is substantially fully closed. According to an embodiment of the invention, the braking force of the wheel brake is controlled such that a predetermined deceleration is established upon the coast downshifting operation. This makes it possible to prevent the shock from being caused by the sharp change in the engine braking force, thus establishing the predetermined deceleration performance. This embodiment for controlling the braking force of the wheel brake provides excellent response and allows the deceleration control to be performed with further accuracy compared with the general technology for controlling the engine braking force by adjusting the throttle valve of the engine.

In the control apparatus, the braking force of the wheel brake is controlled so as to establish a predetermined target deceleration when the wheel brake is operated through a braking operation of a vehicle operator. According to the embodiment, when the wheel brake is operated by the braking operation performed by the vehicle operator, the braking force of the wheel brake is adjusted so as to reach a predetermined target deceleration value. This makes it possible to establish the predetermined deceleration performance while suppressing the shock caused by the sharp change in the engine braking force.

In the control apparatus, the deceleration is increased by increasing the braking force of the wheel brake upon the coast downshifting in response to a downshifting command from the vehicle operator. Accordingly this makes it possible to smoothly establish the predetermined deceleration performance in response to the request for deceleration represented by the downshifting command.

BRIEF DESCRIPTION OF THE DRAWINGS

FIG. 2 is a table representing an engagement/disengagement state of each of clutches and brakes for establishing the respective speeds of the automatic transmission as shown in FIG. 1;

DETAILED DESCRIPTION OF PREFERRED EMBODIMENTS

Figure 1:
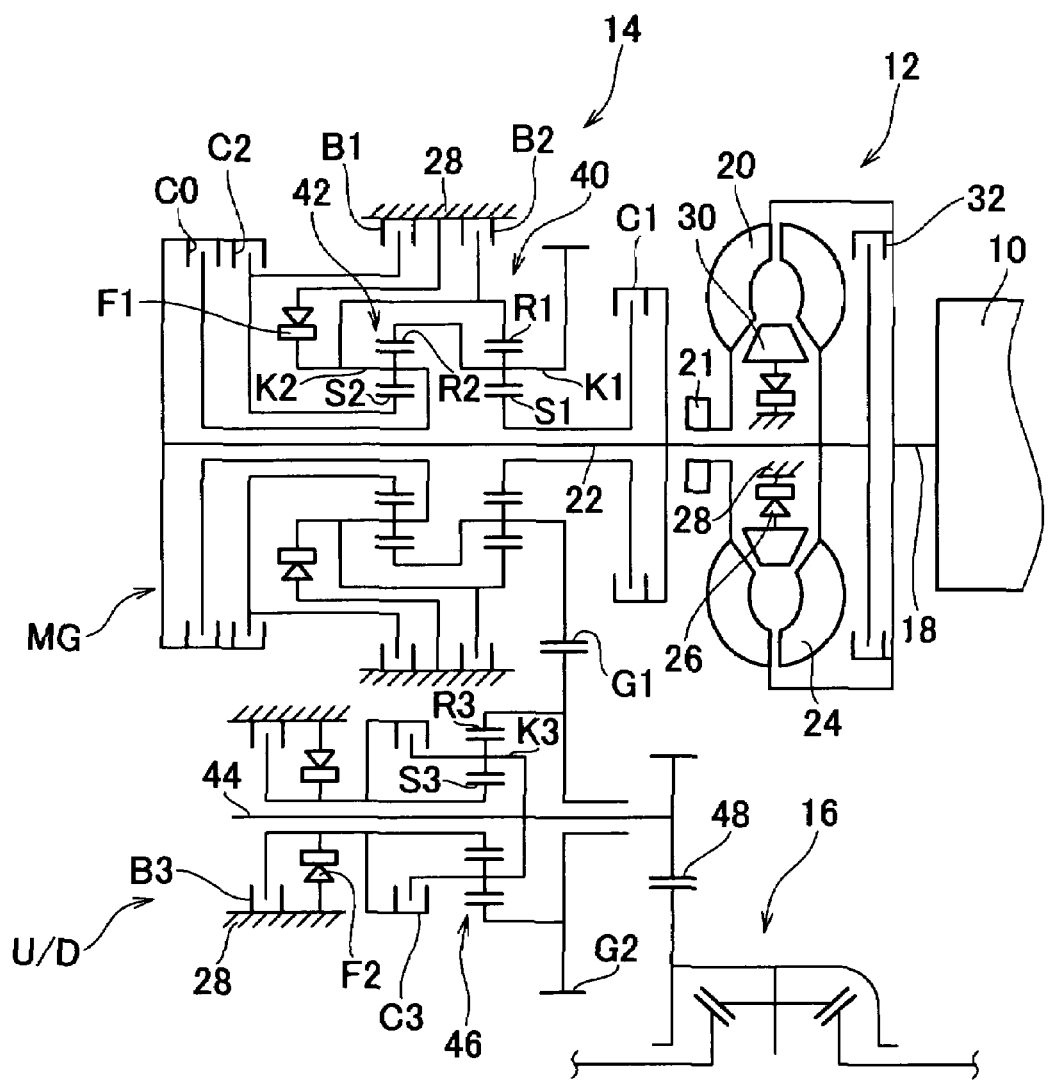
FIG. 1 is a schematic view of a structure of a control apparatus for a vehicle to which the invention is applied.

In an embodiment of the invention, it is preferable that a control apparatus for a vehicle be structured to include, for example, a fluid type power transmission system that is disposed between an automatic transmission and an engine for power transmission using fluid and have a lock-up clutch. In the embodiment, the lock-up clutch is engaged upon establishment of a predetermined lock-up engagement condition including a condition where the vehicle is in the coast state. Preferably in the embodiment, a fuel cut (F/C) control is executed for interrupting a fuel supply to the engine upon establishment of a predetermined F/C condition including a condition where the vehicle is in the coast state in which the throttle valve of the engine is fully closed, and the engine speed is equal to or higher than an engine speed at release of the F/C control (hereinafter referred to as F/C release engine speed).

The engine includes a fuel injection device that automatically interrupts the fuel supply under the F/C control. The F/C release engine speed corresponds to an engine speed at which the engine is operated autonomously upon resumption of the fuel supply. It is preferable to set the F/C release engine speed that is substantially equal to or higher than an idling engine speed.

Various types of automatic transmission may be employed in the embodiment of the invention, for example, a planetary gear type transmission in which a plurality of forward gear stages are established upon engagement/disengagement of a plurality of friction engagement devices, a two-axle type transmission in which a plurality of clutch hub sleeves are moved to establish a plurality of forward gear stages. Other types of the automatic transmission, for example, a continuously variable transmission or CVT may be employed so long as a plurality of forward speeds can be automatically selected. Although a reverse input from the driving wheel is transmitted to the engine, such reverse input does not have to be always transmitted at all the forward gear stages. The reverse input may be transmitted only at a specific forward gear stage or specific forward gear stages at a high speed range or only in the certain condition, for example, under the sports mode.

The aforementioned automatic transmission is structured to automatically select a certain speed among a plurality of forward speeds on the basis of a parameter representing an operating state of the vehicle, for example, a vehicle speed, an opening of the throttle valve and the like. In the coast downshifting state of the vehicle where the throttle valve is fully closed, the vehicle speed in the coast downshifting state (hereinafter referred to as the coast downshifting vehicle speed) is set at each of the forward speeds so as to continue the fuel cut operation. More specifically, it may be set in accordance with an engine speed at release of the fuel/cut (F/C) operation (hereinafter referred to as the F/C release engine speed) and a speed ratio of each of the forward speeds such that downshifting is performed before the engine speed reaches the F/C release engine speed and the engine speed increases thereafter. The invention may be applied to the automatic transmission in which the coast downshifting is performed upon a downshifting command through a shift lever operation in addition to the automatic transmission using the vehicle speed as the parameter.

It is preferable to employ a torque converter with a torque increasing effect as a fluid type power transmission system. However, other type of the fluid type power transmission system, for example, a fluid coupling may be employed. A lock-up clutch serves to directly connect an input member and an output member of the fluid type power transmission system. It is preferable to employ a hydraulic friction engagement device that is frictionally engaged by a differential pressure of the fluid between the oil chamber at the engaged side and the oil chamber at the disengaged side. However, it may be formed as an electromagnetic friction engagement device disposed in parallel with the fluid type power transmission system. This embodiment is structured to execute a feedback control of an engagement torque (the differential pressure as described above) so as to establish a target slip amount. It may be structured to bring the lock-up clutch into a full engagement state.

The wheel brake may be formed as a drum brake or a disc brake that serves to press a friction member against a brake drum or a brake disc using a hydraulic cylinder or an electric motor, respectively, for example. The brake control system is structured to control the braking force by electrically changing an oil pressure of the hydraulic cylinder or the torque of the electric motor. Generally the brake control system is formed as an anti-lock brake system (ABS) that controls the braking force up to a maximum value corresponding to the braking force to be generated by the braking operation of the vehicle operator. Alternatively, the brake control system may be structured to generate the braking force irrespective of the braking operation performed by the vehicle operator as described in another embodiment of the invention.

The deceleration control in the coast downshifting state may be executed only by the brake control system. However, the deceleration control may be executed in parallel with those controls with respect to a throttle of the engine, ISC (idling engine speed control) valve, engine braking force by adjusting the intake/exhaust valve, a transmission torque such as a clutch on a power transmission path and the like.

The deceleration upon the coast downshifting may be set on the basis of an operation state of the vehicle represented by a vehicle speed and a shift speed selected after the downshifting, the vehicle operator's intention to decelerate represented by operations of a shift lever and the brake pedal, and an amount of the braking force, and a state of the road on which the vehicle is running represented by the slope, curve, or whether the road is highway or local street. The deceleration may be set in accordance with the timing during downshifting and the timing after downshifting. The road condition may be determined by detecting the slope of the road using an acceleration sensor. However, various types of road information may be read from the outside through the navigation system, for example.

The deceleration of the vehicle can be derived from the change in the engine speed or a predetermined rotational speed within the automatic transmission as well as the change in the vehicle speed. The target deceleration may be set such that the vehicle speed is reduced at a positive, that is, constant change ratio. Alternatively, the vehicle may be operated at the deceleration of zero, that is, at a constant speed.

The deceleration control performed by the brake control system makes it possible to establish a predetermined deceleration not only upon the coast downshifting state but also upon the ON/OFF timing of the F/C control or ON/OFF timing of the lock-up clutch. Such control may be performed to establish the smooth deceleration at an appropriate deceleration rate by detecting the distance between running vehicles or the respective vehicle speeds thereof.

Embodiments

An embodiment of the invention will be described referring to the drawings. FIG. 1 is a schematic view of a power train of an FF (front engine front drive) vehicle having an engine laterally mounted. An output of an engine 10 such as a gasoline engine that generates power through fuel combustion is transmitted to driving wheels or front wheels (not shown) via a torque converter 12, an automatic transmission 14, and a differential gear unit 16. The torque converter 12 includes a pump blade 20 connected to a crank shaft 18 of the engine 10, a turbine blade 24 connected to an input shaft 22 of the automatic transmission 14, a stator 30 fixed to a housing 28 as a non-rotational member via a one-way clutch 26, and a lock-up clutch 32 that directly connects the crank shaft 18 to the input shaft 22 via a damper (not shown). The lock-up clutch 32 is a hydraulic friction engagement device that is frictionally engaged by a differential pressure between an oil chamber at the engagement side and an oil chamber at the disengagement side. The pump blade 20 is connected to a mechanical oil pump 21 such as a gear pump so as to be rotated together with the pump blade 20 by the engine 10, generating an oil pressure for shifting or lubricating. The engine 10 serves as the driving power source, and the torque converter 12 serves as a fluid type power transmission system.

The automatic transmission 14 includes a pair of a first planetary gear drive 40 and a second planetary gear drive 42 of single pinion type each constituting a planetary gear mechanism which is disposed coaxially with the input shaft 22, and connected to the carrier and the ring gear, that is, so called CR-CR connection type, a pair of third planetary gear drive 46 disposed coaxially with a counter shaft 44 in parallel with the input shaft, and an output gear 48 which is fixed to an end of the counter shaft 44 and meshed with the differential gear unit 16. The respective elements that form the planetary gear drives 40, 42, 46, that is, sun gears, ring gears, and carriers that rotatively support the planetary gear in mesh with sun gears and the ring gears are selectively connected with each other or connected to the input shaft 22 via four clutches C0, C1, C2, and C3, respectively. They are also selectively connected to a housing 28 as a non-rotating member via brakes B1, B2, and B3. Those gears are brought into engagement with each other or with the housing 28 depending on the respective rotating directions of two one-way clutches F1, F2. As the differential gear unit 16 has a symmetrical structure with respect to the axle, the lower part of the differential gear drive 16 is not shown in FIG. 1.

A main shift portion MG having four forward speeds and one reverse speed is formed of the pair of the first and the second planetary gear drives 40, 42, clutches C0, C1, C2, brakes B1, B2, and the one-way clutch F1, which are disposed coaxially with the input shaft 22. An under drive portion U/D as an auxiliary shift portion is formed of a pair of planetary gear drive 46, clutch C3, brake B3 and a one-way clutch F2, which are disposed coaxially with the counter shaft 44. In the main shift portion MG, the input shaft 22 is connected to a carrier K2 of the second planetary gear drive 42, a sun gear S1 of the first planetary gear drive 40, and a sun gear S2 of the second planetary gear drive 42 via the clutches C0, C1, and C2, respectively. The portion between the ring gear R1 of the first planetary gear drive 40 and the carrier K2 of the second planetary gear drive 42 is connected to the portion between the ring gear R2 of the second planetary gear drive 42 and the carrier K1 of the first planetary gear drive 40. The sun gear S2 of the second planetary gear drive 42 is connected to the housing 28 as the non-rotational member via the brake B1. The ring gear R1 of the first planetary gear drive 40 is connected to the housing 28 as the non-rotational member via the brake B2. The one-way clutch F1 is disposed between the carrier K2 of the second planetary gear drive 42 and the housing 28 as the non-rotational member. A first counter gear G1 fixed to the carrier K1 of the first planetary gear drive 40 is meshed with a second counter gear G2 fixed to the ring gear R3 of the third planetary gear drive 46 such that power is transmitted between the main shift portion MG and the under drive portion U/D. In the under drive portion U/D, the carrier K3 of the third planetary gear drive 46 is connected to the sun gear S3 via the clutch C3, and the brake B3 and the one-way clutch F2 are disposed in parallel between the sun gear S3 and the housing 28 as the non-rotational member.

The aforementioned clutches C0 to C3 and the brakes B1 to B3 (hereinafter collectively referred to as a clutch C and a brake B) constitute a hydraulic friction engagement device, for example, a multi plate disk clutch or a band brake, which is controlled to be engaged by the hydraulic actuator. The hydraulic circuit is controlled by operating a manual valve or applying/stopping apply of electric current to linear solenoid valves SL1, SL2, SL3, SLT, and solenoid valves DSL, S4, SR of a hydraulic control circuit 98 (FIG. 3) such that the engagement/disengagement state is selected to establish five forward speeds (1st to 5th), one reverse speed (Rev.), and a neutral state in accordance with an operating position of a shift lever 72 (FIG. 3) as shown in FIG. 2. Referring to FIG. 2, the "1st" to "5th" correspond to the first to the fifth forward speeds, respectively. Referring to FIG. 2, the code "O" represents an engagement state, the code "X" represents a disengagement state, and the code "Δ" represents the engagement state not related to power transmission. According to this embodiment, in the shift speed selected from the 2nd to the 5th speed at the position D, a reverse input from the driving wheel is transmitted to the engine 10 so as to generate the engine braking force. The shift lever 72 is set to one of the parking position P, the reverse position R, neutral position N, and forward positions D, 4, 3, 2, L in accordance with the shift pattern. When the shift lever 72 is set to the positions "P" and "N", the neutral state is established so as to interrupt power transmission. When the shift lever 72 is set to the position P, the mechanical parking brake (not shown) serves to mechanically interrupt rotation of the driving wheel.

Figure 3:
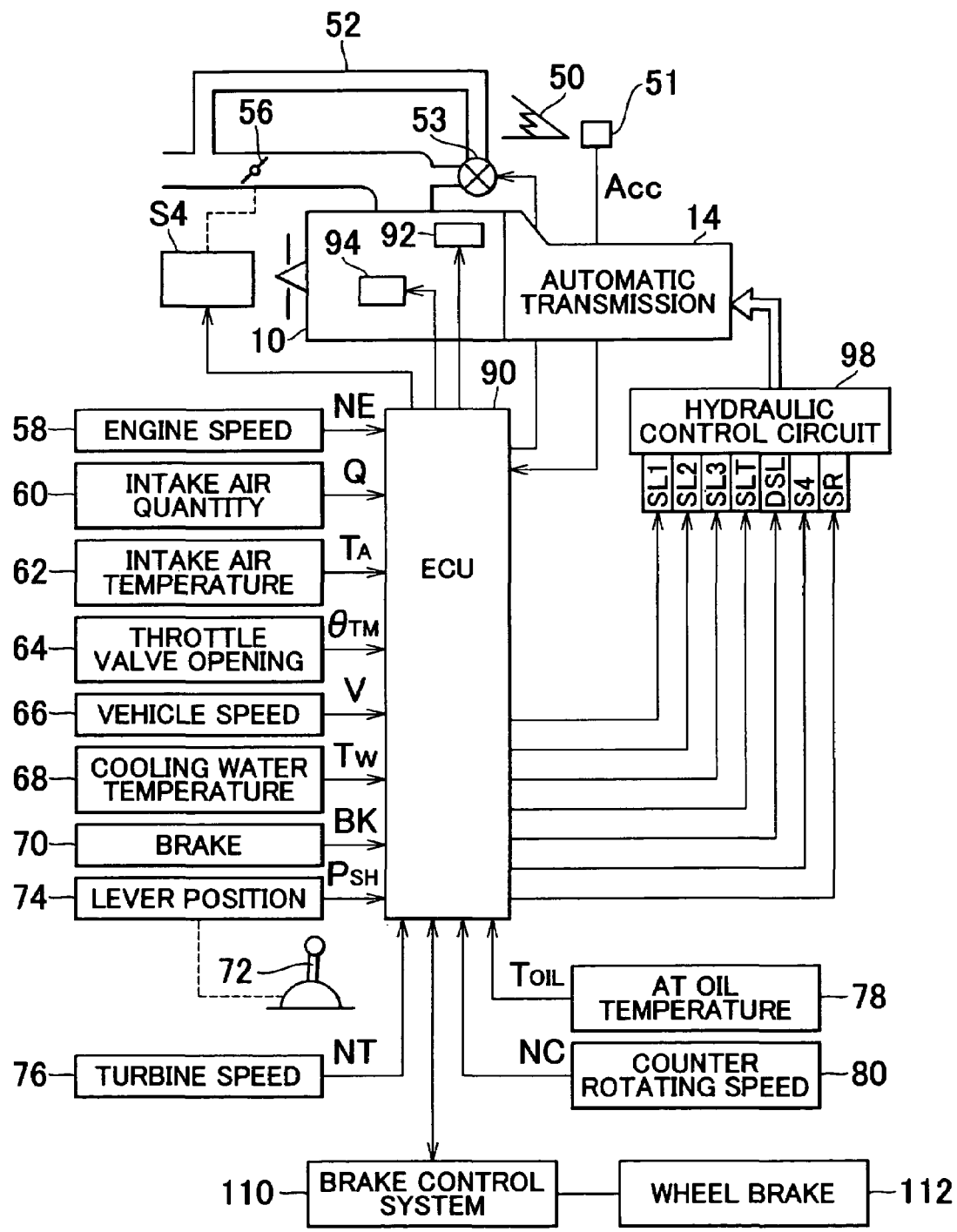
FIG. 3 is a block diagram of a control system of the control apparatus for controlling the engine and the shifting.
Figure 4:
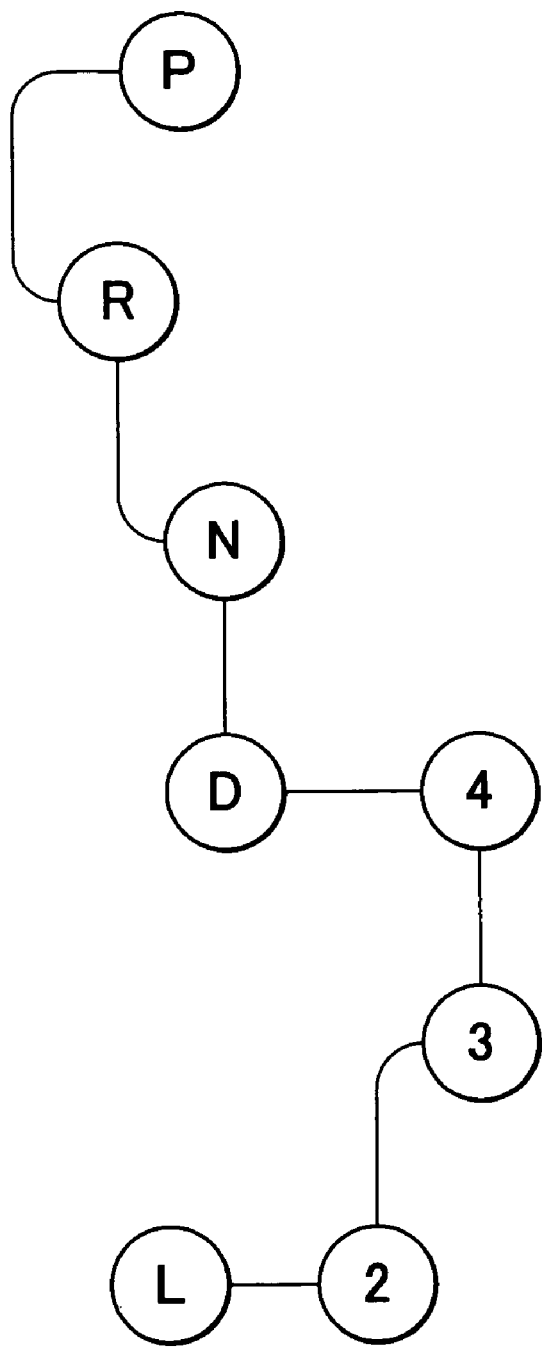
FIG. 4 is a view that represents an example of a shift pattern of a shift lever as indicated in FIG. 3.

FIG. 3 is a block diagram of a control system provided in the vehicle for controlling the engine 10 and the automatic transmission 14 as shown in FIG. 1. An accelerator operating amount sensor 51 is operated to detect an operating amount Acc of an accelerator pedal 50. The accelerator pedal 50 is formed as an accelerator operation member that is operated by a vehicle operator to be depressed in accordance with the required output amount. The accelerator operating amount Acc corresponds to the required output amount. An intake pipe of the engine 10 includes an electronic throttle valve 56 that is operated to be opened at an opening angle $\theta_{TH}$ in accordance with the accelerator operating amount Acc by the throttle actuator 54. A bypass passage 52 for bypassing the electronic throttle valve 56 under the idling speed control is provided with an ISC (idling speed control) valve 53 that controls the intake air quantity in a fully closed state of the electronic throttle valve 56 so as to control the idling speed $NE_{IDL}$ of the engine 10. Additionally, provided in the control system are an engine speed sensor 58 for detecting an engine speed NE of the engine 10, an intake air quantity sensor 60 for detecting an intake air quantity Q, an intake air temperature sensor 62 for detecting a temperature $T_A$ of the intake air, a throttle sensor 64 with the idling switch for detecting the full closed state (idling) of the electronic throttle valve 56 and the opening degree $\theta_{TH}$, a vehicle speed sensor 66 for detecting a rotational speed $N_{OUT}$ of a counter shaft 44 corresponding to the vehicle speed V, a cooling water temperature sensor 68 for detecting a temperature $T_W$ of a cooling water for the engine 10, a brake switch 70 for detecting a depressing operation of the brake pedal of the normally used brake, a lever position sensor 74 for detecting a lever position (operating position) $P_{SH}$ of the shift lever 72, a turbine rotational speed sensor 76 for detecting the rotational speed NT of the turbine (=rotational speed $N_{IN}$ of the input shaft 22), an AT oil temperature sensor 78 for detecting a temperature $T_{OIL}$ of the work fluid in the hydraulic control circuit 98, and a counter rotational speed sensor 80 for detecting a rotational speed NC of a first counter gear G1. The aforementioned sensors provide signals indicating the engine speed NE, intake air quantity Q, intake air temperature $T_A$, throttle valve opening $\theta_{TH}$, vehicle speed V, engine cooling water temperature $T_W$, operating state BK of the normally used brake, lever position $P_{SH}$ of the shift lever 72, turbine rotating speed NT, AT oil temperature $T_{OIL}$, and counter rotational speed NC are supplied to an electronic control unit 90. The normally used brake operated by depressing the brake pedal corresponds to the wheel brake 112. However, the operation of the brake may be controlled by the control system 110 as well as the brake pedal.

The electronic control unit (ECU) 90 is formed of a micro computer including a CPU, a RAM, a ROM, an input/output interface, and the like. The CPU serves to execute processing of signals in accordance with the program stored in the ROM while using the temporary storage function of the RAM. This makes it possible to perform the output control of the engine 10, the shift control of the automatic transmission 14, and engagement/disengagement of the lock-up clutch 32. The ECU 90 may be structured, in case of necessity, to be divided into two sections, one for controlling the engine and the other for controlling shifting.

Figure 5:
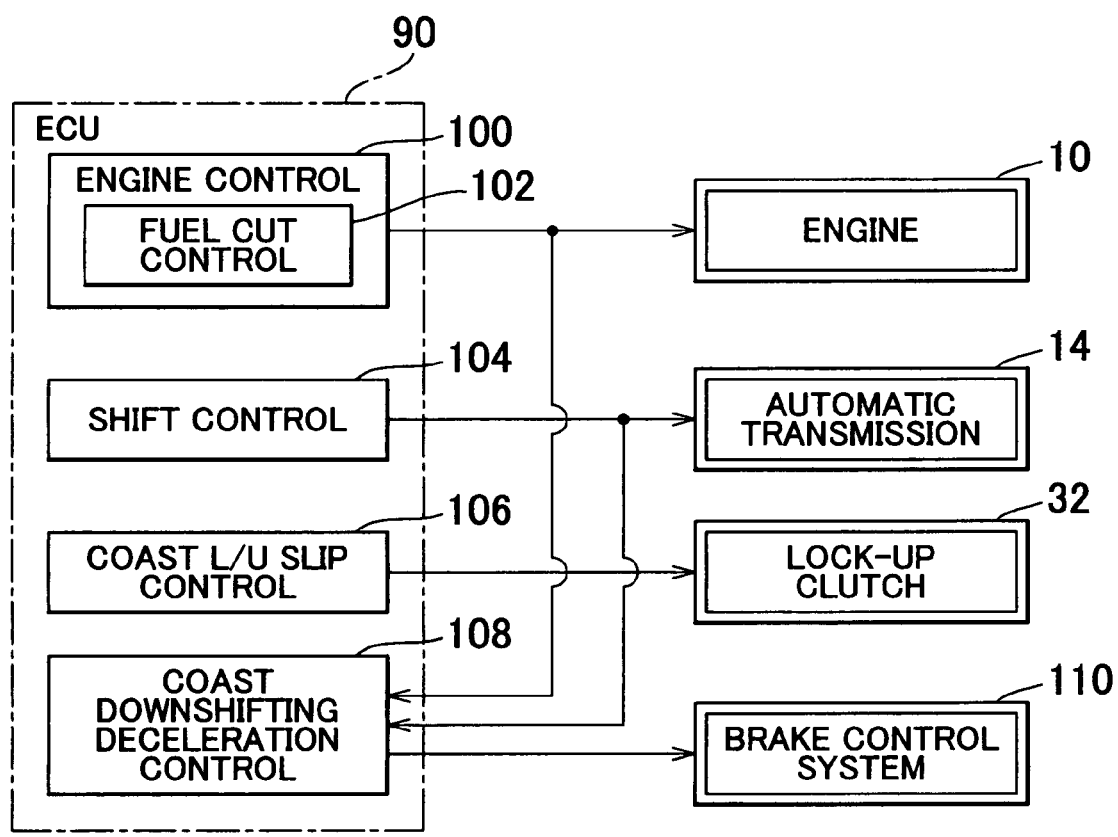
FIG. 5 is a block diagram of the respective functions executed through signal processing in an electronic control unit as shown in FIG. 3.

FIG. 5 is a block diagram representing various functions performed by the ECU 90 that processes signals. The ECU 90 includes various functions as an engine control section 100, a shift control section 104, a coast L/U slip control section 106, and a coast downshifting deceleration control section 108. The ECU 90 is connected with a brake control system 110 that allows the wheel brake 112 (see FIG. 3) mounted on the wheel to generate the braking force irrespective of the braking operation performed by the vehicle operator. The brake control system 110 serves to electrically control the operating state (braking force) of the wheel brake 112 upon receipt of the command from the coast down deceleration control unit 108. The wheel brake 112 constitutes the hydraulic friction engagement device such as a drum brake or a disc brake which generates the braking force by pressing the friction member against the brake drum or the brake disc upon supply of the oil pressure to the hydraulic cylinder. Like the ECU 90, the brake control system 110 is formed of a micro computer including CPU, RAM, ROM, input/output interface and the like.

Figure 6:
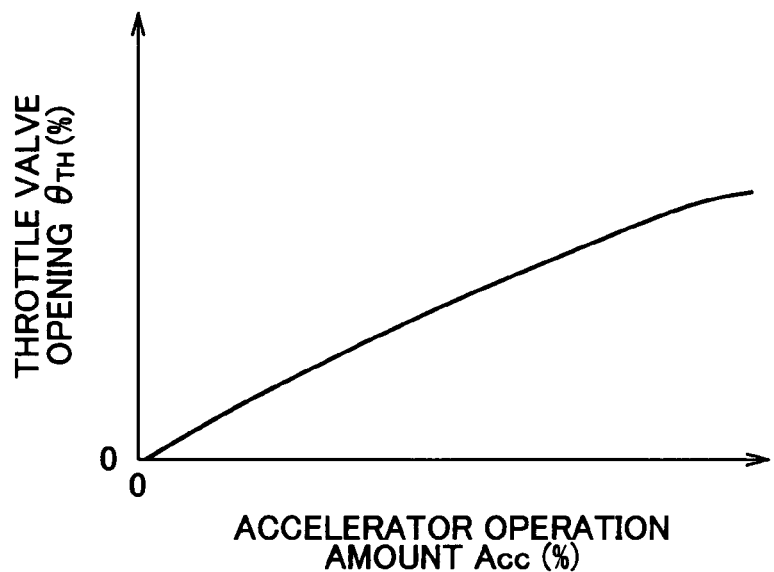
FIG. 6 is a view representing an exemplary relationship between an acceleration amount Acc and a throttle valve opening $\theta_{TH}$ based on which the throttle control is executed as indicated in FIG. 5.

Referring to FIG. 5, the engine control section 100 of the ECU 90 basically controls outputs of the engine 10. More specifically, the engine control section 100 controls the opening/closing operation of the electronic throttle valve 56 by the throttle actuator 54, controls the fuel injection valve 92 for adjusting the quantity of the injected fuel, controls the ignition device 94 such as an igniter for adjusting the ignition timing, and controls the ISC valve 53 for adjusting the idle speed. The control of the electronic throttle valve 56 is executed by driving the throttle actuator 54 based on the actual accelerator operation amount Acc such that the throttle valve opening $\theta_{TH}$ is increased as the increase in the accelerator opening amount Acc as shown in the graph of FIG. 6.

The engine control section 100 includes a fuel cut control function 102 that serves to interrupt supply of the fuel to the engine 10 when a predetermined condition for the fuel cut control is established so as to improve the fuel efficiency. The predetermined condition includes conditions where: a) the throttle valve opening $\theta_{TH}$ is substantially zero, b) the vehicle is running forward in the coast state, and c) the engine speed NE is equal to or higher than a predetermined F/C release engine speed $NE_{FC}$. The F/C release engine speed $NE_{FC}$ at which the engine 10 activates autonomously immediately after resumption of the fuel supply may be set to a predetermined constant value. Alternatively, the F/C release engine speed $NE_{FC}$ is set to the value variable in accordance with the change in the engine load resulting from operation of the accessories such as an air conditioning unit.

Figure 7:
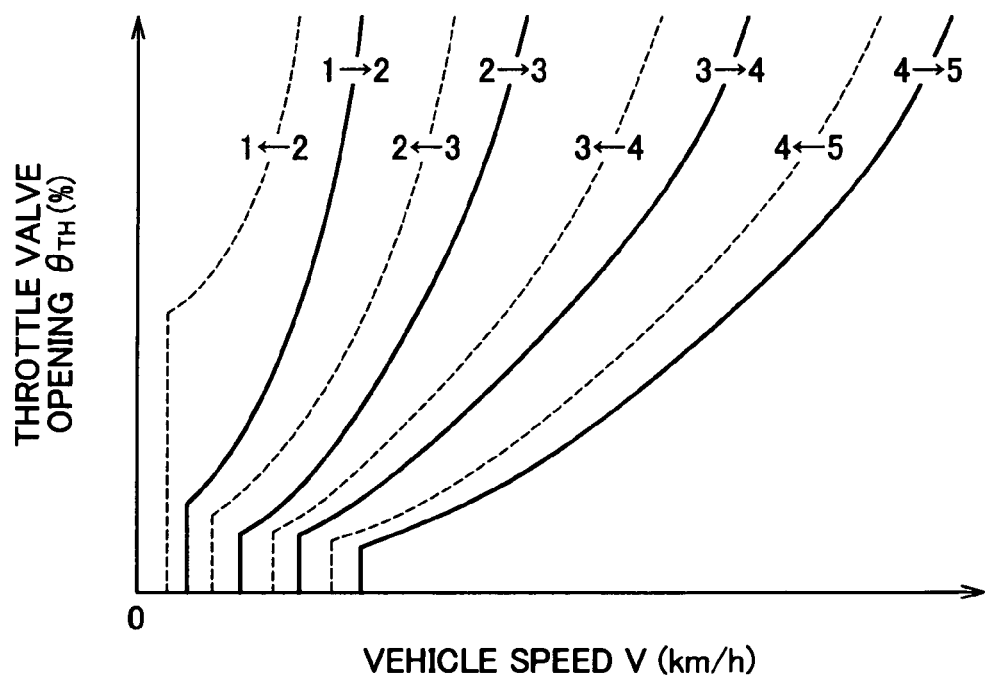
FIG. 7 is a view representing an example of a shift map used for the shift control as indicated in FIG. 5.

The shift control section 104 of the ECU 90 determines a shift speed of the automatic transmission 14 on the basis of the actual throttle valve opening $\theta_{TH}$ and the vehicle speed V derived from the preliminarily stored shift map (shift condition) as shown in FIG. 7. The shift control section 104 then selects ON (electricity is applied)/OFF (application of electricity is stopped) state of each of the solenoid DSL, S4, and SR in the hydraulic control circuit 98, or continuously changes the ON (electricity is applied) state of each of the linear solenoids SL1, SL2, S13, and SLT through the duty control such that the determined shift speed is established. The solid line of the graph shown in FIG. 7 represents the upshifting line, and the dashed line represents the downshifting line. As shown in the graph of FIG. 7, as the vehicle speed V decreases or the throttle valve opening $\theta_{TH}$ increases, the shift speed is selected to the one as being the lower speed having a larger speed ratio (=input engine speed $N_{IN}$/output engine speed $N_{OUT}$). The numbers 1 to 5 in FIG. 5 represent the first (1st) to the fifth (5th) shift speeds, respectively.

When the position D is set, the shift control is executed with respect to all the shift speeds. When the position 4 is set, the shift control is executed in the 4th and lower speeds. When the position 3 is set, the shift control is executed in the 3rd and lower speeds. When the position 2 is set, the shift control is executed in the 2nd and lower speeds. When the position L is set, the 1st shift speed is held. In the state where the vehicle is running downhill in the position D at the 5th speed, the shift lever 72 is operated to positions 4, 3 and 2. Accordingly the automatic transmission 14 performs downshifting from the 5th speed to the 4th speed, the 3rd speed, and the 2nd speed, sequentially. Then the engine braking force is increased stepwise as the downshifting is performed. In the aforementioned case, the downshifting command is established by operating the shift lever 72.

In the case where the downshifting is performed in the coast state where the throttle valve opening $\theta_{TH}$ is substantially zero, the coast downshifting vehicle speed is set at each forward shift speed such that the fuel cut control is continued. More specifically, the coast downshifting vehicle speed is set in accordance with the F/C release engine speed $NEF_C$ and the speed ratio at each forward shift speed such that the downshifting is performed before the engine speed NE reaches the F/C release engine speed $NE_{FC}$ and the engine speed NE is increased thereafter. In this case, the downshifting is performed at the higher vehicle speed side from the downshifting line (dashed line) when the throttle valve opening $\theta_{TH}$ is equal to zero as shown in FIG. 7. In the case where the F/C release engine speed $NE_{FC}$ is changed as the engine load varies, it is preferable to change the coast downshifting vehicle speed accordingly.

The coast L/U slip control section 106 executes a feedback control of an engagement torque of the lock-up clutch 32 or the differential pressure such that the lock-up clutch 32 is engaged at a predetermined target slip amount SLP (−50 rpm, for example,) when the vehicle is running forward in the coast state where the throttle valve opening $\theta_{TH}$ is substantially zero. Under the aforementioned slip control, the reverse input from the driving wheel is transmitted to the engine 10, and the engine speed NE is increased to reach around the turbine rotational speed NT such that the fuel cut region (vehicle speed range) is expanded to improve the fuel efficiency. The coast L/U slip control section 106 serves to bring the lock-up clutch into an engagement in the coast state. The lock-up clutch 32 is completely engaged or slip engaged in the complete engagement region and the slip engagement region which have been set using parameters such as the throttle valve opening $\theta_{TH}$ and the vehicle speed V at a timing other than the coast state.

Figure 8:
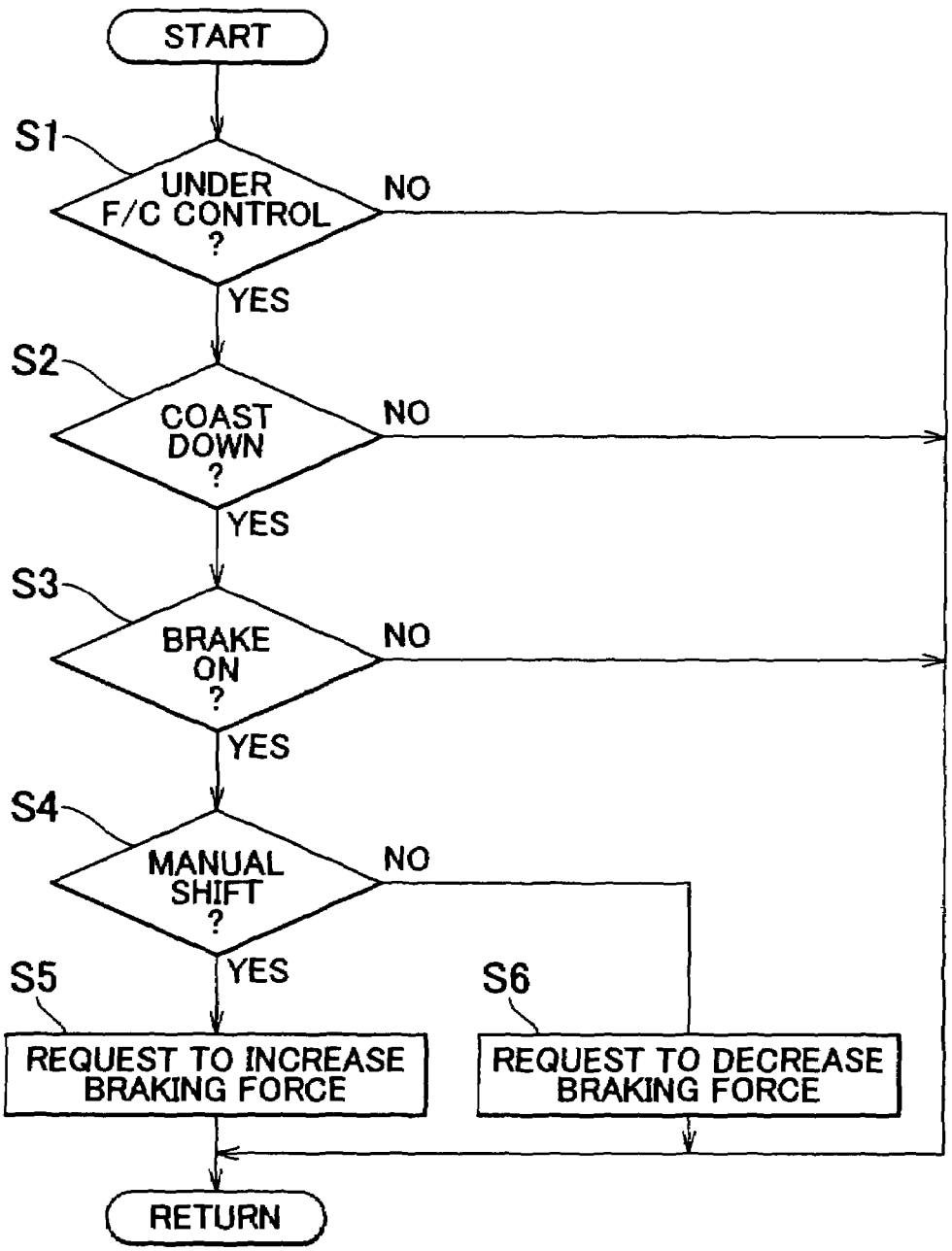
FIG. 8 is a flowchart representing a routine for the deceleration control upon the coast downshifting operation of the vehicle.

The coast downshifting deceleration control section 108 of the ECU 90 controls the braking force of the wheel brake 112 by the brake control system 110 such that a predetermined deceleration is established upon the coast downshifting in the automatic transmission 14 during forward running of the vehicle in the coast state where the throttle valve opening $\theta_{TH}$ is substantially zero. The coast downshifting deceleration control section 108 further processes signals in accordance with the flowchart shown in FIG. 8. In step S1 of the flowchart, it is determined whether the fuel cut control has been executed. If YES is obtained, that is, the fuel cut control has been executed, the process proceeds to step S2. In step S2, it is determined by the shift control section 104 whether the coast downshifting has been executed. Command signals to the fuel injection valve 92 may be used to determine whether the fuel cut control has been executed. The application of the electric current to the solenoid DSL, S4, SR may be used to determine whether the coast downshifting has been performed. In the case where the coast downshifting is performed under the fuel cut control, the routine in step S3 and subsequent steps will be executed.

If YES is obtained in step S2, the process proceeds to step S3 where it is determined whether the wheel brake 112 is in ON state resulting from the operation of the brake pedal performed by the vehicle operator based on the signal of the brake switch 70. If YES is obtained in step S3, that is, the brake is in ON state, the process proceeds to step S4. In step S4, it is determined whether the coast downshifting is performed upon manual shifting, that is, operation of the shift lever 72. If the downshifting is performed resulting from operation of the shift lever 72, the process proceeds to step S5 as it is determined that the vehicle operator requires to have the vehicle decelerated by increasing the engine braking force. In step S5, the signal demanding the increase in the braking force is sent to the brake control system 110. If NO is obtained in step S4, that is, the manual shifting is not performed, the process proceeds to step S6 where the signal demanding offset of the increase in the engine braking force by the inertia upon increase in the engine speed NE owing to the downshifting is sent to the brake control system 110. The brake control system 110 controls the braking force of the wheel brake 112 in accordance with the increase in the braking force and the command for deceleration. If the increase in the braking force is required, the deceleration is increased by increasing the braking force to be equal to or higher than the braking force generated by the depression of the brake pedal. If the decrease in the braking force is required, the braking force is decreased to be equal to or lower than the braking force generated by the depression of the brake pedal so as to moderate the sharp decrease owing to the sharp increase in the engine braking force. The decreased deceleration is gradually increased to reach a normal braking force. Then the braking force is feedback controlled such that the predetermined deceleration is established while monitoring the vehicle speed V. The deceleration control may be executed while executing the engine braking control by operating the electronic throttle valve 56 of the engine 10 or the ISC valve 53, transmission torque control such as the clutch C0, C1 of the automatic transmission 14.

In the aforementioned vehicle control apparatus, in the case where the coast downshifting is performed upon a downshifting command from the vehicle operator by braking operation under the fuel cut control, the braking force of the wheel brake 112 is increased to increase the deceleration in step S5. Therefore, the predetermined deceleration can be smoothly realized in response to the deceleration command indicating the deceleration request of the vehicle operator. Meanwhile, in the case where the coast downshifting is performed upon decrease in the vehicle speed V to reach the coast downshifting vehicle speed, the braking force of the wheel brake 112 is decreased in step S6 so as to offset the increase in the engine braking force owing to the inertia caused by the downshifting to increase the engine speed NE. As a result, the shock felt by the vehicle operator owing to the sharp increase in the engine braking force may be suppressed. Especially as the braking force of the wheel brake 112 is controlled, the resultant response is improved compared with the control of the engine braking force itself by adjusting the electronic throttle valve 56 of the engine 10. Accordingly, the deceleration can be controlled with great accuracy while increasing the deceleration by increasing the braking force.

Another embodiment of the invention will be described hereinafter. In this embodiment, the same elements as those of the aforementioned embodiment will be designated with the same reference numerals, and their descriptions will be omitted.

Figure 9:
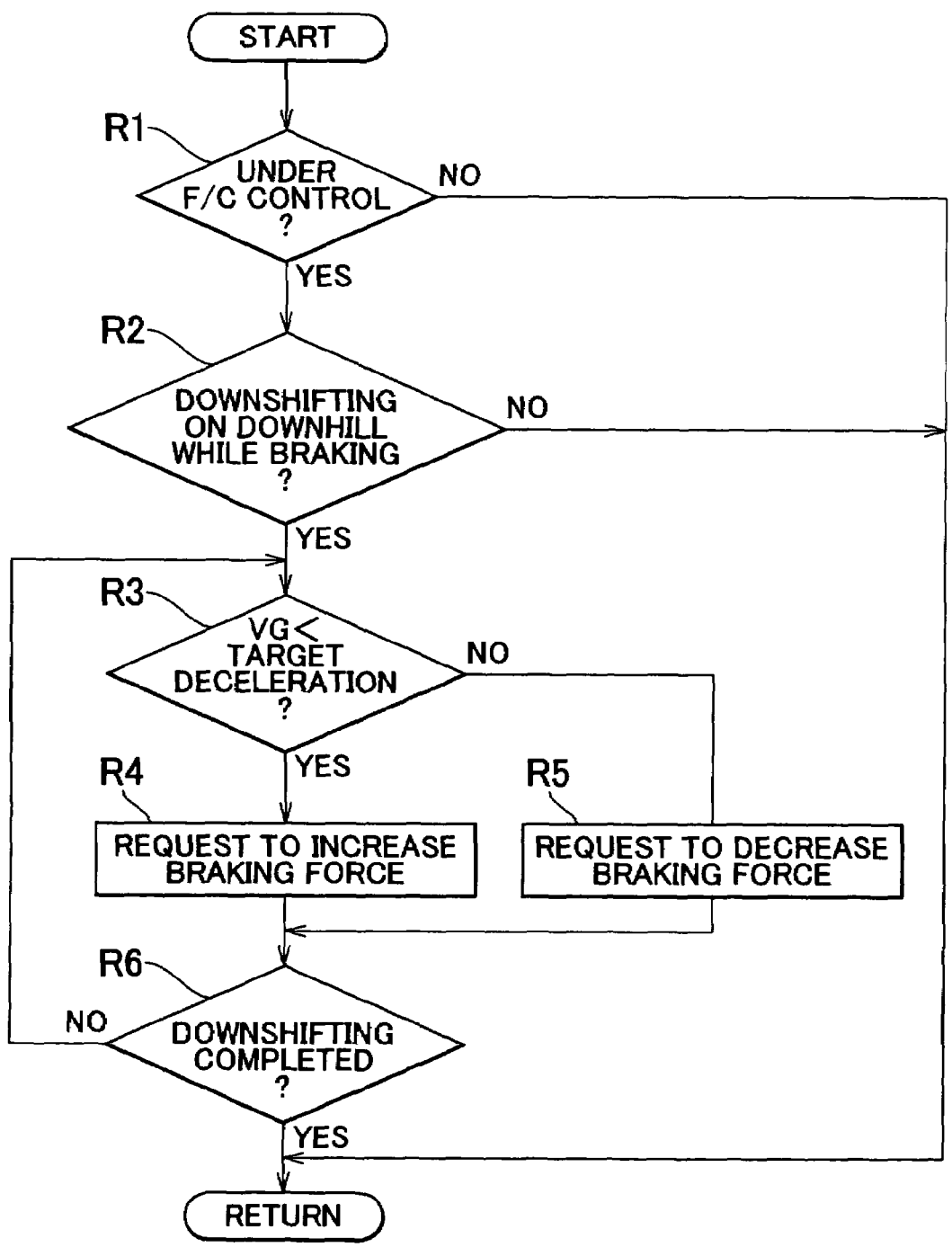
FIG. 9 is a flowchart representing another routine for the deceleration control upon the coast downshifting operation of the vehicle.

The flowchart of FIG. 9 represents another control routine executed by the coast down deceleration control section 108 in the case where the shift control section 104 serves to cause the automatic transmission 14 to perform downshifting upon the braking operation during running downhill in the coast state. In step R1, it is determined whether the fuel cut control is being executed. If YES is obtained in R1, the process proceeds to step R2 where it is determined whether the downshifting during running downhill is performed upon ON state of the brake. The shift speed or the change rate in the vehicle speed V (acceleration) or the road slope sensor (acceleration sensor) may be used to determine whether the vehicle is running downhill. If the vehicle is running downhill at a predetermined slope or higher, the downshifting is performed upon ON state of the brake.

If YES is obtained in R2, that is, the downshifting is performed upon braking operation during running downhill, the process proceeds to step R3 where it is determined whether the actual vehicle deceleration VG is smaller than the target deceleration. The actual deceleration VG is derived from the vehicle speed V detected by the vehicle speed sensor 66, for example. The target deceleration is calculated based on a map in which the vehicle speed V and the shift speed after downshifting are stored as parameters.

If YES is obtained in step R3, that is, the actual deceleration VG is smaller than the target deceleration, the process proceeds to step R4. In step R4, the command for increasing the braking force is output to the brake control system 110 so as to increase the deceleration VG. Meanwhile, if NO is obtained in step R3, that is, the actual deceleration VG is equal to or larger than the target deceleration, the process proceeds to step R5 where the command for decreasing the braking force is output to the brake control system 110 so as to decrease the deceleration VG. Then in step R6, it is determined whether the coast downshifting is finished resulting from the increase in the engine speed NE. The step in R3 and subsequent steps are repeatedly executed until the coast downshifting is finished. As a result, the braking force of the wheel brake 112 is controlled such that the deceleration VG becomes substantially equal to the target deceleration. The deceleration VG may be controlled while executing the engine braking force control by opening/closing the electronic throttle valve 56 and the ISC valve 53 of the engine 10, and the slip control (transmission torque control) of the clutches C0, C1 of the automatic transmission 14.

In the aforementioned embodiment, the wheel brake 112 is operated upon the braking operation of the vehicle operator during the coast downshifting under the fuel cut control. The braking force of the wheel brake 112 is increased or decreased so as to be substantially equal to the predetermined target deceleration. As a result, the predetermined deceleration may be obtained while suppressing the shock felt by the vehicle operator owing to the sharp change in the engine braking force upon downshifting.

While the invention has been described in its preferred embodiments, it is to be understood that within the scope of the appended claims, the invention may be practiced otherwise than as specifically described.

What is claimed is:

1. A control apparatus for a vehicle comprising:
    an engine that generates power through combustion of fuel,
    an automatic transmission adapted to transmit a reverse input from a driving wheel to the engine and automatically performs a shifting to a speed selected among a plurality of forward speeds each having a different speed ratio;
    a brake control system that electrically controls a braking force of a wheel brake; and
    a controller that causes the brake control system to control the braking force of the wheel brake such that a predetermined deceleration is established upon a coast downshifting of the automatic transmission during running of the vehicle in a coast state where a throttle valve of the engine is substantially fully closed.

2. A control apparatus for a vehicle according to claim 1, further comprising a hydraulic power transmission system disposed between the automatic transmission and the engine for power transmission using fluid and having a lock-up clutch, wherein:
    the controller engages the lock-up clutch upon establishment of a predetermined lock-up engagement condition including at least a condition where the vehicle is running in the coast state; and
    the controller executes a fuel-cut control for stopping a fuel supply upon establishment of a predetermined fuel-cut condition including at least a condition where the vehicle is running in the coast state, and an engine speed is equal to or higher than a predetermined value.

3. A control apparatus for a vehicle according to claim 2, wherein the hydraulic power transmission system comprises one of a torque converter and a fluid coupling.

4. A control apparatus for a vehicle according to claim 1, wherein the controller serves to control the braking force of the wheel brake so as to establish a predetermined target deceleration when the wheel brake is operated through a braking operation of a vehicle operator.

5. A control apparatus for a vehicle according to claim 1, wherein the controller serves to increase the deceleration by increasing the braking force of the wheel brake upon the coast downshifting in response to a downshifting command from a vehicle operator.

6. A control apparatus for a vehicle according to claim 2, wherein the controller serves to control the braking force of the wheel brake so as to establish a predetermined target deceleration upon one of an ON/OFF timing of the fuel cut control and an ON/OFF timing for engagement of the lock-up clutch.

7. A control method for a vehicle including an engine that generates power through combustion of fuel, an automatic transmission adapted to transmit a reverse input from a driving wheel to the engine and automatically performs a shifting to a speed selected among a plurality of forward speeds each having a different speed ratio, a brake control system that electrically controls a braking force of a wheel brake, the method comprising causing the brake control system to control the braking force of the wheel brake such that a predetermined deceleration is established upon a coast downshifting of the automatic transmission during running of the vehicle in a coast state where a throttle valve of the engine is substantially fully closed.

8. A control method for a vehicle according to claim 7, wherein a hydraulic power transmission system that is disposed between the automatic transmission and the engine for power transmission using fluid and having a lock-up clutch is provided, the method comprising:
    engaging the lock-up clutch upon establishment of a predetermined lock-up engagement condition including at least a condition where the vehicle is running in the coast state, and
    executing a fuel-cut control for interrupting a fuel supply upon establishment of a predetermined fuel-cut condition including at least a condition where the vehicle is running in the coast state, and an engine speed is equal to or higher than a predetermined value.

9. A control method for a vehicle according to claim 7, wherein the braking force of the wheel brake is controlled so as to establish a predetermined target deceleration when the wheel brake is operated through a braking operation of a vehicle operator.

10. A control method for a vehicle according to claim 7, a deceleration is increased by increasing the braking force of the wheel brake upon the coast downshifting in response to a downshifting command from a vehicle operator.

11. A control method for a vehicle according to claim 8, wherein the braking force of the wheel brake is controlled so as to establish a predetermined target deceleration upon one of an ON/OFF timing of the fuel cut control and an ON/OFF timing for engagement of the lock-up clutch.

* * * * *